United States Patent [19]
Wyman et al.

[11] Patent Number: 5,377,832
[45] Date of Patent: Jan. 3, 1995

[54] FILM CANISTER WITH SELF-LOCATING ASSEMBLY FEATURES

[75] Inventors: Stuart J. Wyman, St. Paul, Minn.; Devin L. Cantonwine, Medford, Oreg.

[73] Assignee: Minnesota Mining and Manufacturing Company, St. Paul, Minn.

[21] Appl. No.: 177,699

[22] Filed: Jan. 4, 1994

Related U.S. Application Data

[63] Continuation of Ser. No. 945,536, Sep. 16, 1992, abandoned.

[51] Int. Cl.⁶ .............................................. B65D 85/67
[52] U.S. Cl. .................................... 206/397; 242/348.4
[58] Field of Search ................. 206/316.1, 389, 397, 206/403, 404, 405, 406, 407, 408; 242/71.7

[56] References Cited

U.S. PATENT DOCUMENTS

| | | | |
|---|---|---|---|
| 1,987,247 | 1/1935 | Schnitzler | 206/389 X |
| 4,239,164 | 12/1980 | Barnsbee et al. | 242/71.7 X |
| 4,671,409 | 6/1987 | Espy | 206/397 |
| 4,787,513 | 11/1988 | Auble et al. | 242/71.7 X |
| 4,826,008 | 5/1989 | Cloosterman | 206/407 X |
| 4,842,211 | 6/1989 | Robbins | 242/71.7 X |
| 4,928,827 | 5/1990 | Hara | 206/407 X |

FOREIGN PATENT DOCUMENTS

| | | | |
|---|---|---|---|
| 2119156 | 2/1983 | Germany | 206/316.1 |
| 0593144 | 5/1959 | Italy | 206/316.1 |
| 0245392 | 7/1947 | Switzerland | 206/316.1 |
| 0750070 | 6/1956 | United Kingdom | 206/316.1 |
| 0877299 | 9/1961 | United Kingdom | 206/316.1 |
| 2083439 | 3/1982 | United Kingdom | 206/316.1 |

*Primary Examiner*—Paul T. Sewell
*Assistant Examiner*—Ted Kavanaugh
*Attorney, Agent, or Firm*—Gary L. Griswold; Walter N. Kirn; William D. Bauer

[57] ABSTRACT

A light-tight canister for a roll of photosensitive media including an opaque tubular sleeve having outer ends, a pair of identical end caps with peripheral edges configured to engage and enclose the ends of the sleeve, and a tie bar extending through the sleeve and configured for locking engagement with the end caps. The tubular sleeve includes a media exit slot extending between the outer ends and a tapered notch on each end positioned with respect to the media exit slot. Each end cap includes a media exit slot accommodating structure and a tapered tab configured to mate with a notch in the sleeve. The tab is positioned with respect to the media exit slot accommodating structure so the media exit slot accommodating structure is aligned with the media exit slot of the sleeve when the end cap is engaged with the sleeve and the tab is mated with the notch. Sloping guide walls are radially positioned on the inside surface of the end cap about a location at which the tie bar is engaged with the end cap.

1 Claim, 3 Drawing Sheets

FILM CANISTER WITH SELF-LOCATING ASSEMBLY FEATURES

This is a continuation of application Ser. No. 07/945,536 filed Sep. 16, 1992, abandoned.

BACKGROUND OF THE INVENTION

The present invention relates generally to containers for photosensitive media. In particular, the present invention is a roll film canister assembled from components having self-locating features.

Light-tight film canisters are generally known and disclosed, for example, in the Espy U.S. Pat. No. 4,671,409. The Espy canister is configured to hold rolls of photosensitive media such as microfilm used in reader/printers, and includes a tubular sleeve closed at both ends by opaque end caps. The end caps are lockingly interconnected by a rigid tie bar that extends between the end caps through the roll of film. Film is withdrawn from the canister through an elongated exit slot in the sleeve.

The tie bar includes a pair of resilient fingers on each of its opposite ends. During the assembly of the canister, the fingers are deformed under pressure and snapped into central apertures in the end caps. Overlapping strips of plush material such as felt or flocking extend from the opposite sides of the film exit slot to provide a light-tight seal that will not damage the film. The edges of the end caps have exit slot accommodating structures configured to mate with the film exit slot and plush material.

Film canisters of the type described above are typically assembled in red light or darkroom conditions to prevent damage to the film contained therein. These assembly procedures are described generally in the Espy Patent referred to above. Although all the components are press-fit and snapped together, the poor lighting conditions hamper the efficiency of the assembly operation. For example, the assembler will generally have to locate the position of the central aperture in the end cap by hand before snapping the tie rod into the end cap. Furthermore, unless the exit slot accommodating structure on the end cap is properly aligned with the slot on the sleeve, light can enter the canister and damage the film.

It is evident that there is a continuing need for improved film canisters. In particular, there is a need for film canisters that can be easily and accurately assembled under the low light conditions in which these assembly operations are typically performed. The canister must of course be relatively inexpensive to be commercially viable.

SUMMARY OF THE INVENTION

The present invention is a relatively inexpensive, light-tight roll film canister having components with self-locating features. The self-locating features enable the canister to be easily and accurately assembled under low light conditions. The canister includes an opaque tubular sleeve having edges on its outer ends. The sleeve has a film exit slot which extends between the edges, and a first alignment key structure adjacent each edge and positioned with respect to the media exit slot. The outer ends of the sleeve are enclosed by a pair of opaque end caps having peripheral edges configured to engage the edges of the sleeve. Each end cap includes a media exit slot accommodating structure and a second alignment key structure. The second alignment key structures are configured to mate witch the first alignment key structures. The second alignment key structures are positioned with respect to the exit slot accommodating structures so the exit slot accommodating structures are aligned with the film exit slot of the sleeve when the end caps are engaged with the sleeve and the second alignment key structures are mated with the first alignment key structures.

In one embodiment the end caps include inner and outer peripheral wall flanges forming a peripheral groove configured to engage the edges of the sleeve. The first alignment key structures on the sleeve include notches with tapered edges. The second alignment key structures on the end caps include tabs in the grooves and having tapered edges. Portions of the inner wall flanges of the end caps adjacent the notches are also tapered. The tapered notches, tabs and end cap wall flanges facilitate the assembly and proper alignment of the end caps and sleeve. Skirts extend from the outer wall flanges of the end caps to cover the mated notches and tabs and help prevent light leakage.

In another embodiment the canister includes a tie bar which extends through the sleeve and has opposite ends configured for locking engagement with central apertures in the end caps. Guide structures on the end caps form sloping surfaces converging toward the central apertures. The guide structures, which are radially positioned sloping walls in one embodiment, guide the tie bar into locking engagement with the end caps.

In yet another embodiment, the end caps are substantially identical. The notches on the edges of the sleeve are positioned with respect to the film exit slot to enable the use of the same end caps on both ends of the sleeve.

DETAILED DESCRIPTION OF THE PREFERRED EMBODIMENTS

Figure 1:
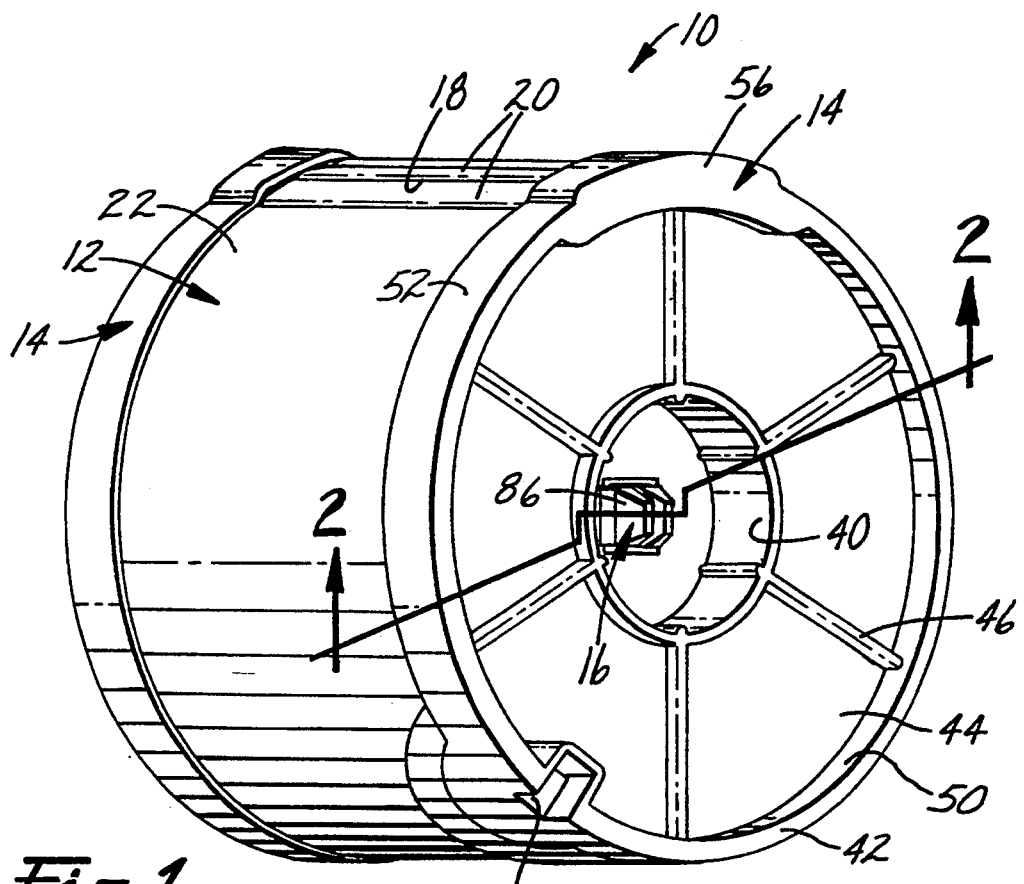
FIG. 1 is a perspective view of a roll film canister including the self-locating features of the present invention.
Figure 2:
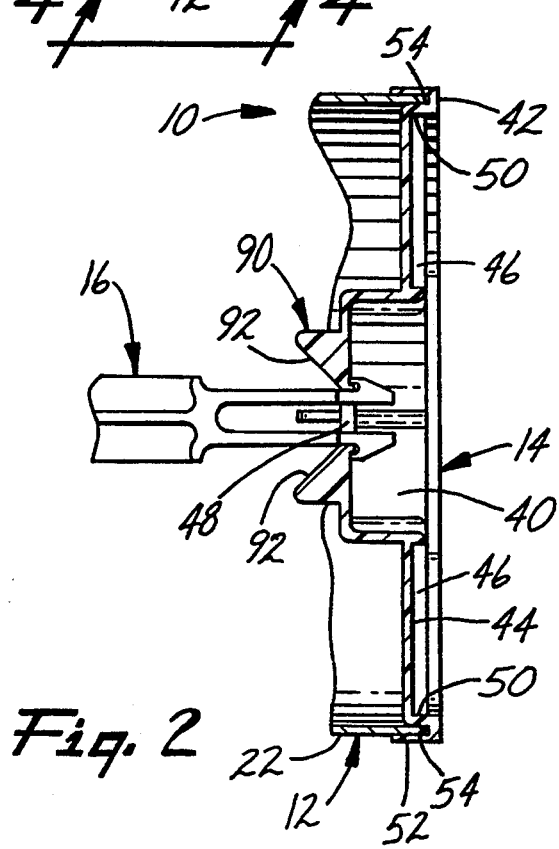
FIG. 2 is a sectional view taken along line 2—2 in FIG. 1 and illustrating the mated tie bar and end cap.

A light-tight photosensitive media canister 10 in accordance with the present invention is illustrated generally in FIGS. 1 and 2. As shown, canister 10 includes an opaque tubular sleeve 12 and a pair of opaque end caps 14 mounted to the opposite ends of the sleeve. A tie rod 16 extends through sleeve 12 and has its opposite ends lockingly engaged to the centers of the end caps 14. A roll of film (not shown) is positioned within canister 10 around tie rod 16. The film is withdrawn from canister 10 through a media exit slot 18 that extends along the length of sleeve 12 between end caps 14. A light-tight seal at media exit slot 18 is provided by overlapping layers of black plush (e.g., felt) material 20. In one embodiment, canister 10 is configured to hold rolls of dry silver film used in microfilm reader/printers.

Figure 3:
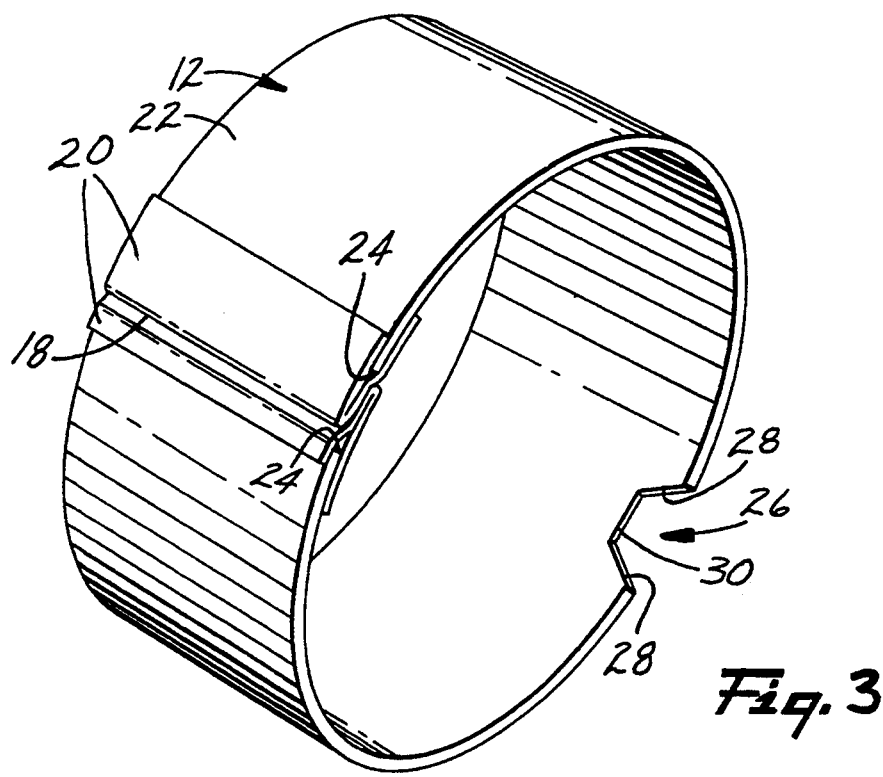
FIG. 3 is a detailed view of the sleeve of the canister shown in FIG. 1.

Sleeve 12 can be described in greater detail with reference to FIG. 3. In one embodiment, sleeve 12 is cut from a spiral wound fiberboard tube 22 having a black mat finish. A narrow, axially aligned section is cut from tube 22 to create a gap formed by edges 24. Folded strips of the black plush material 20 are adhesively secured to edges 24. The strips of material 20 extend into the gap in tube 22 and overlap one another to form a light-tight seal at media exit slot 18. Although not shown, the strips of plush material 20 can be internally reinforced with thin, resilient polymer film to help urge the two pieces of material together where they overlap.

End caps 14 can be described in greater detail with reference to FIG. 1 and 2. In one embodiment, end caps 14 are molded polymer members, each of which includes a central hub 40, a sleeve engaging rim 42 and a wall 44 that extends between the hub and rim. Stiffening ribs 46 on the outside of walls 42 extend radially from hubs 40 to rims 42 to provide rigidity to end caps 14. Hubs 40 extend into sleeve 12 and are sized to receive and center the roll of film. Central apertures 48 extend through hubs 40 and are configured to receive tie bar 16. Rims 42 each include an inner wall flange 50 and an outer wall flange 52 that form a peripheral groove 54 sized to receive and frictionally engage the edges on the outer ends of sleeve 12. Rims 42 also include exit slot accommodating structures 56 which are extended width portions of grooves 54 configured to engage the portions of sleeve 12 adjacent media exit slot 18 and the strips of plush material 20.

To ensure the correct positioning of end caps 14 on sleeve 12 by aligning exit slot accommodating structures 56 with the exit slot 18 during the assembly of canister 10, the sleeve and end caps include first and second complimentary alignment key structures, respectively. In the embodiment described herein and shown in FIG. 3, the first alignment key structures on sleeve 12 are notches 26 which are cut or otherwise formed in the edges of both outer ends of tube 22 (only one is visible in FIG. 3). Notches 26 have sloping or tapered edges 28. The openings of notches 26 in the edges of tube 22 are therefore wider than the bottoms 30 of the notches.

Figure 4:
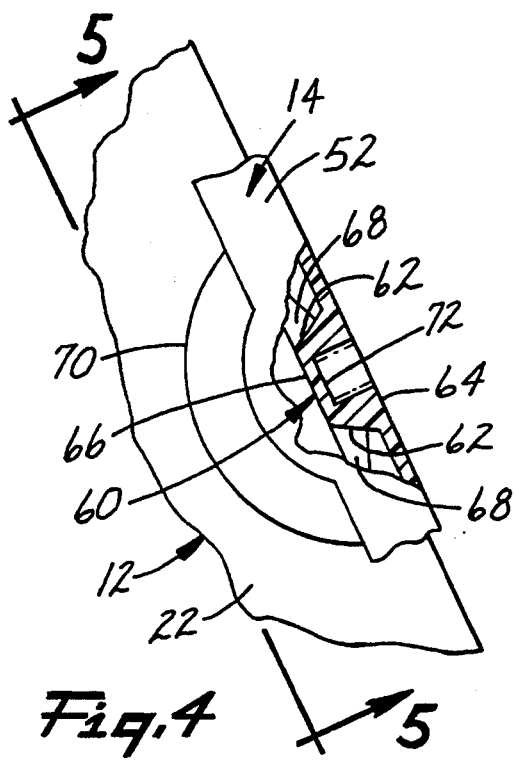
FIG. 4 is a detailed sectional view taken along line 4—4 in FIG. 1 and illustrating the mated tab and notch.
Figure 5:
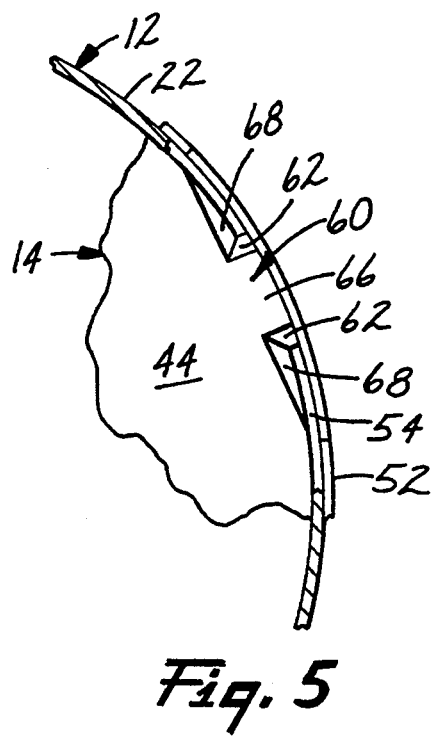
FIG. 5 is a detailed sectional view taken along line 5—5 in FIG. 4 and illustrating the notch and wall flanges of the end cap.

FIGS. 4 and 5 illustrate tabs 60 (only one is shown) which function as the second alignment key structures on end caps 14. Tabs 60 are positioned in grooves 54 and each includes a base 64, free end 66 and edges 62. Tabs 60 are sized and configured to mate with notches 26 in sleeve 12. Accordingly, bases 64 are wider than free ends 66, resulting in sloping or tapered edges 62. Inner wall flanges 50 of end caps 14 also include guide portions 68 immediately adjacent both edges 62 of tabs 60. As shown in FIGS. 4 and 5, guide portions 68 of wall flanges 50 slope inwardly toward hubs 40 as they extend from the bottoms of grooves 54 toward walls 44.

End caps 14 also include skirts 70 which are positioned adjacent tabs 60 and extend toward sleeve 12 from outer walls 52. As shown in FIG. 4, skirts 70 are semicircular in shape and large enough to extend beyond the intersection of mated tabs 60 and notches 26. The inside surfaces of skirts 70 (the sides facing hubs 40) extend perpendicularly from and are flush with the inside surfaces of outer wall flanges 52 so as to fit snugly against the exterior surface of tube 22 when end caps 14 are positioned on sleeve 12. The exterior surfaces of skirts 70 are tapered and extend toward the interior surface of the skirt at a non-perpendicular draft angle of about one degree with increasing distance from rims 42.

Cartridge positioning slots 72 are located on the outside surface of end caps 14 (the sides away from sleeve 12). Slots 72 are open to the outside surfaces of end caps 14 and extend through the outer sides of rims 42. As perhaps best shown in FIG. 4, slots 72 are recessed or formed within tabs 60. Slots 72 are configured to mate with tabs (not shown) in the reader/printer or other device using cartridge 10 to ensure proper positioning and alignment of the cartridge within the device.

Tabs 60 and slots 26 are used to locate and align the exit slot accommodating structures 56 of end caps 14 with the film exit slot 18 on sleeve 12. This function dictates certain constraints on the relative positioning of these elements. In particular, the distance between the slot accommodating structures 56 and tabs 60 about the perimeter of end caps 14 must be equal to the distance between the slot 18 and notches 26 about the perimeter of sleeve 12. In a preferred embodiment of canister 10, the distances between media exit slot 18 and notches 26 on both opposite ends of sleeve 12 are equal. End caps 14 can therefore be "universal" components enabling the same end caps to be used on either end of the sleeve.

Figure 6:
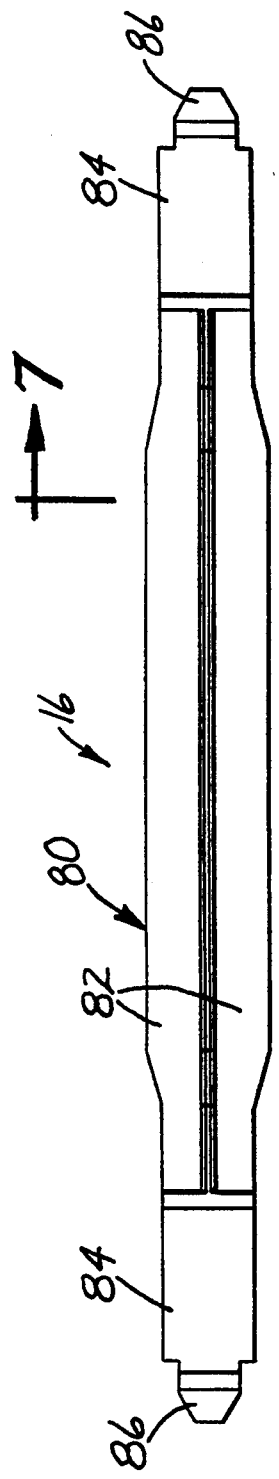
FIG. 6 is a side view of the tie bar in one position.
Figure 7:
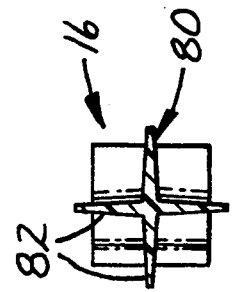
FIG. 7 is a sectional view of the tie bar taken along lines 7—7 in FIG. 6.
Figure 8:
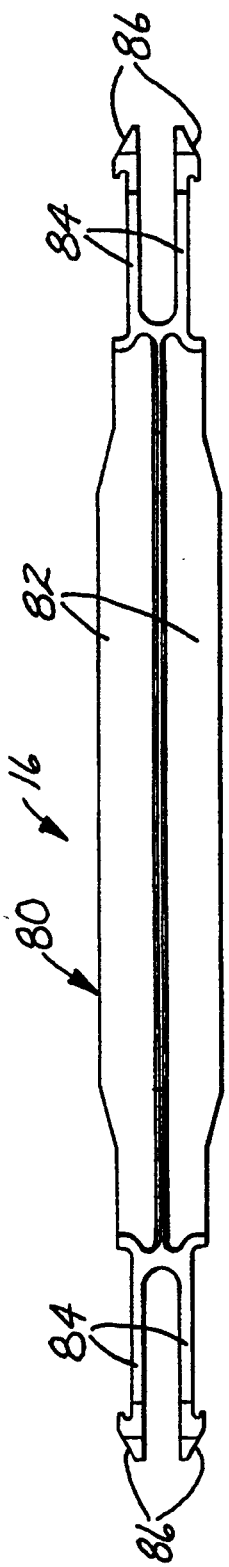
FIG. 8 is a side view of the tie bar in a position rotated 90° about its lengthwise axis from the position shown in FIG. 6.

Tie bar 16 can be described with reference to FIGS. 6–8. As shown, tie bar 16 includes a central shaft portion 80 formed by a plurality of radially oriented stiffening ribs 82. A pair of resilient fingers 84 project from each end of the central shaft portion 80. Fingers 84 are configured to be received by the central apertures 48 in the hubs 40 of end caps 14, and include truncated, inclined end portions 86 to facilitate inward deformation of the fingers upon pressure engagement with the central aperture of the hub. Once the end portions 86 of fingers 84 have been inserted all the way through apertures 48, the resilient nature of the fingers causes the fingers to spring back to their original positions, thereby lockingly engaging tie bar 16 with end caps 14. Tie bar 16 can be identical to that described in the Espy U.S. Pat. No. 4,671,409.

To facilitate the assembly of tie bar 16 and end caps 14, the inside surfaces of end cap hubs 40 include a tie bar guide structures 90 (FIG. 2). In the embodiment shown, guide structures 90 are formed by four sloping or tapered walls 92 (only three are visible in FIG. 2) radially positioned and equally spaced around the central aperture 48. The tapered edges of walls 92 slope toward aperture 48 and thereby function as an internal conical surface converging in the direction of the aperture.

Canister 10 can be assembled in a manner similar to that of known canisters and described above in the Background Of The Invention section. However, this assembly procedure can be performed with greater simplicity and efficiency by means of the present invention. Proper alignment of the slot accommodating structures on the end caps with the media exit slot of the sleeve is ensured by the mating of the tabs on the end caps and the notches in the sleeve. The tapered edges on the tabs and notches also function as guides to help the assembler align the end caps and sleeve under the low light conditions in which the canister is typically assembled. The tapered surfaces of the end cap inner wall flanges on the opposite sides of the tabs also guide the engagement of the end caps with the sleeve while preventing the corners of the notches from bending over.

The skirts fit snugly against the outer surface of the sleeve to prevent any light leakage between the tabs and notches after the end caps have been positioned on the sleeve. The guides on the inside surfaces of the end caps help the assembler properly position the tie bar with respect to the central apertures when snapping the tie bar into the end caps. Furthermore, the "universal" nature of the end cap reduces the number of different molds needed to manufacture the canister, as well as the number of different parts required for assembly. Precision molding of the skirt is facilitated by the draft angle. All these features help minimize the cost of the canisters.

Although the present invention has been described with reference to preferred embodiments, those skilled in the art will recognize that changes may be made in form and detail without departing from the spirit and scope of the invention.

What is claimed is:

1. A light-tight canister for a roll of photosensitive media, comprising:
    an opaque tubular sleeve having outer ends with edges, including:
        a media exit slot extending between the outer ends; and
        a first alignment key structure adjacent each edge and positioned with respect to the media exit slot; and
    a pair of opaque end caps with peripheral edges configured to engage the edges and enclose the outer ends of the sleeve, each end cap including:
        a media exit slot accommodating structure; and
        a second alignment key structure configured to mate with the first alignment key structure and positioned with respect to the exit slot accommodating structure providing only one alignment in which the exit slot accommodating structure is aligned with the media exit slot of the sleeve when the end cap is engaged with the sleeve and the second alignment key structure is mated with the first alignment key structure;
    wherein each first alignment key structure includes a notch in the edge of the sleeve;
    wherein each second alignment key structure includes a tab extending from the peripheral edge of the end cap and sized to fit within the notch in the edge of the sleeve;
    wherein the notch of each first alignment key structure includes tapered edges;
    wherein the tab of each second alignment key structure includes tapered edges,
    wherein each end cap further includes:
    inner and outer peripheral wall flanges defining a edge of the tubular sleeve;
    a taper on a portion of the inner wall flange adjacent the tab; and
    a skirt extending from the outer wall flange to cover the notch in the sleeve when the end cap is engaged with sleeve;
    wherein each end cap is a molded polymer member and the skirt further includes:
    an inside surface extending in a perpendicular direction from an inside surface of the outer wall flange to fit flush with an outer surface of the sleeve when the cap is engaged with the sleeve; and
    an outer surface having at least a portion extending from an outer surface of the outer wall flange at a non-perpendicular draft angle.

* * * * *